May 2, 1950
H. L. BLYDENBURGH
2,505,878
CUTTING REEL UNIT FOR LAWN MOWERS
Filed Nov. 16, 1946
2 Sheets-Sheet 1
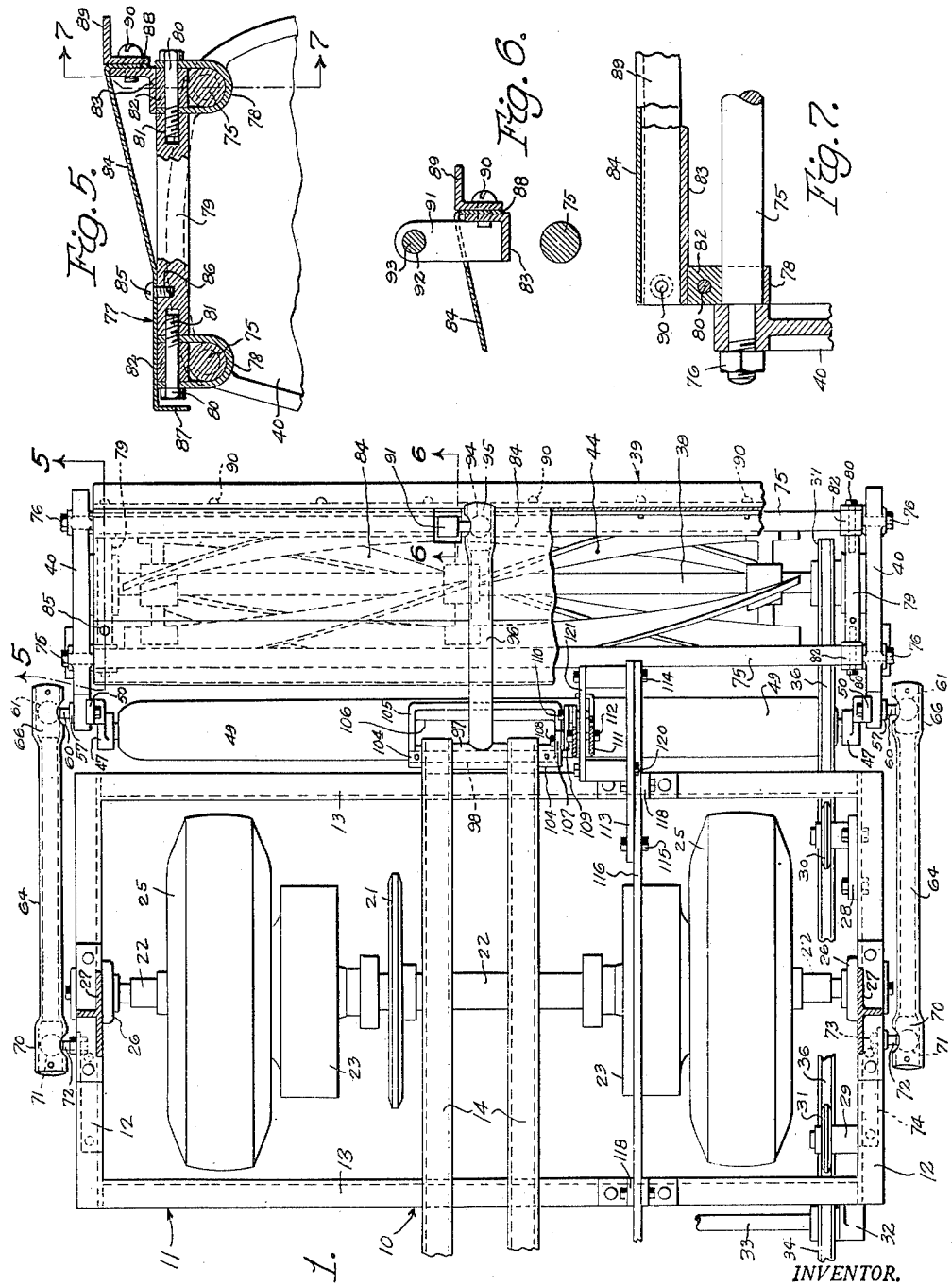
INVENTOR.
Harold L. Blydenburgh
BY
Barthel + Bugbee
ATTYS May 2, 1950 H. L. BLYDENBURGH 2,505,878
CUTTING REEL UNIT FOR LAWN MOWERS
Filed Nov. 16, 1946 2 Sheets-Sheet 2
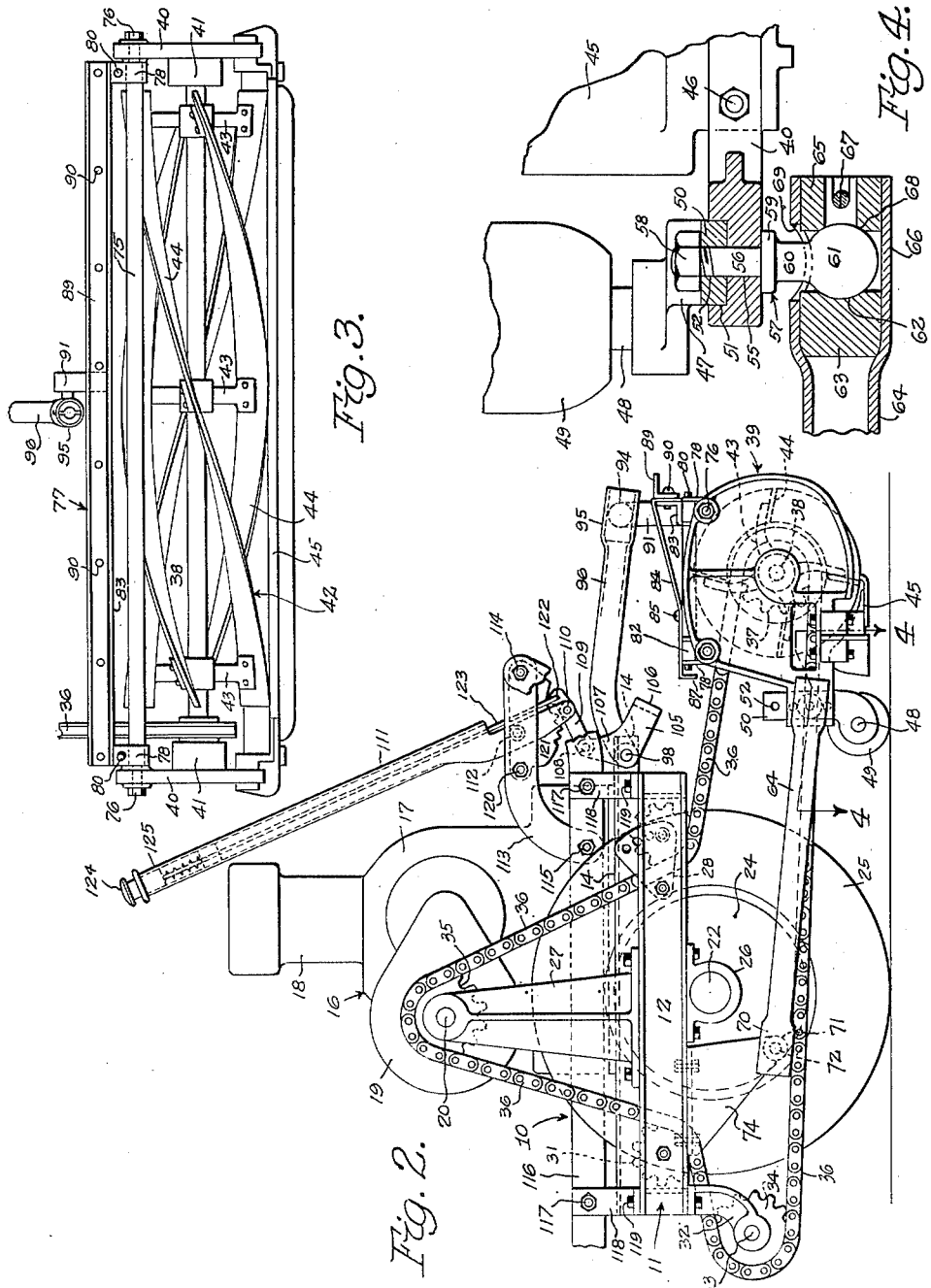
INVENTOR.
Harold L. Blydenburgh
BY
Barthel & Bugbee
ATTYS Patented May 2, 1950

2,505,878

UNITED STATES PATENT OFFICE 2,505,878

CUTTING REEL UNIT FOR LAWN MOWERS

Harold L. Blydenburgh, Highland Park, Mich., assignor to The Moto-Mower Company, Detroit, Mich., a corporation of Michigan Application November 16, 1946, Serial No. 710,243

10 Claims. (Cl. 56—26)

This invention relates to power lawnmowers and in particular to the construction of the cutting reel units of such mowers.

One object of this invention is to provide an improved construction for cutting reel units of power lawnmowers wherein the unit is made more rigid so as to substantially eliminate the weaving or twisting of the frame thereof and consequently relieve strain and wear upon the cutting reel.

Another object is to provide an improved construction for cutting reel units of power lawnmowers wherein the cutting reel unit, in addition to the cross-rods, is additionally strengthened and made more rigid by a frame structure arranged above and connected to the cross-rods so as to substantially eliminate weaving thereof.

Another object is to provide a cutting reel unit for power lawnmowers wherein an improved construction is provided for the connection of the radius rods which at the same time serves as an adjusting device for the ground roller of the unit.

Other objects and advantages of the invention will become apparent during the course of the following description of the accompanying drawings, wherein:

Figure 1 is a top plan view of the forward portion of a power lawnmower, with the engine removed, showing the improved construction of a cutting reel unit according to a preferred form of the invention, with certain portions thereof broken away;

Figure 2 is a side elevation of the forward portion of the power lawnmower shown in Figure 1, with the engine shown diagrammatically;

Figure 3 is a front elevation of the cutting reel unit shown in Figures 1 and 2;

Figure 4 is an enlarged fragmentary horizontal section taken along the line 4—4 in Figure 2, showing the combined radius rod connection and ground roller adjustment of the invention;

Figure 5 is a fragmentary vertical section along the line 5—5 in Figure 1, showing a portion of the strengthened cutting reel unit structure of the invention;

Figure 6 is a vertical section along the line 6—6 in Figure 1 showing further details of the cutting reel unit structure and Figure 7 is a vertical section along the line 7—7 in Figure 5.

Referring to the drawing in detail, Figures 1 and 2 show the forward end of a power lawnmower generally designated 10, having a rectangular frame 11 composed of longitudinal and transverse channel members 12 and 13 respectively to which are connected parallel longitudinal frame members 14 extending rearwardly to the rear portion and rear wheels (not shown). Mounted on the longitudinal frame members 14 is the base portion 15 of an internal combustion engine, generally designated 16 having a crankcase 17 upon which is mounted the cylinder assembly 18. The engine 16 is conventional and its details form no part of the present invention.

Connected to and driven from the engine crankshaft (not shown) by way of a speed reduction unit 19 is a countershaft 20 upon which is mounted a sprocket and sprocket chain (not shown) which drive a sprocket 21 upon an axle 22 (Figure 1). The latter in turn drives a pair of combined clutch and brake units 23 which in turn drive wheels 24 having tires 25 mounted thereon. The units 23 are individually controlled by means (not shown) in order to steer the mower or to brake it as desired. The opposite ends of the axle 22 are journaled in bearing blocks 26 (Figure 2) bolted to the underside of the longitudinal frame members 12. Bolted to and rising from the upper side of one of the frame members 12 is a bearing bracket 27 in which is journaled the outer end of the countershaft 20.

Bolted to the same longitudinal frame member 12 is a pair of shaft hangers 28 and 29 (Figure 1) on which are rotatably mounted a pair of idler sprockets 30 and 31, and depending therefrom is a shaft hanger 32 (Figures 1 and 2) in which is journaled a shaft 33 carrying a sprocket 34. Mounted on the countershaft 20 near the outer end thereof is a drive sprocket 35 meshing with a sprocket chain 36 which meshes with and is guided by the sprockets 30, 31 and 34 and which meshes with and drives a sprocket 37 upon the cutting reel shaft 38 of a cutting reel unit, generally designated 39, hereinafter described in detail.

The cutting reel unit 39 is provided with side members or side plates 40 carrying bearing members 41 (Figure 3) in which the opposite ends of the cutting reel shaft 38 are journaled. The cutting reel shaft 38 carries a cutting reel, generally designated 42 and having a plurality of spiders 43 on the outer ends of which are mounted spiral cutting blades 44. These cooperate with a fixed cutting blade or cutter bar assembly 45 which is bolted as at 46 (Figure 4) to the side plates 40.

Also bolted to the side plates 40 (Figure 4) are opposed shaft hangers or brackets 47 in which are journaled the opposite ends of a roller shaft 48 upon which is mounted a ground roller 49.

The upper ends of the shaft hangers 47 are in the form of blocks 50 which slide vertically in corresponding guide grooves 51 formed in the side plates 40. The block portions 50 are provided with a series of bolt holes 52 arranged in a vertical row (Figure 2) which are alignable with holes 55 in the side plates 40 and the shank 56 of a combined adjusting bolt and radius rod connection, generally designated 57. The shank 56 is threaded at its inner end to receive a nut 58 by which the shaft hanger 47 is securely clamped within the guide grooves 51. The member 57 is provided with an abutment 59 in the form of an annular flange engaging the side plate 40. Extending outwardly from the abutment 59 is a neck 60 terminating in a ball head 61.

The ball head 61 engages a spherical recess 62 in a plug 63 forced into the end of a tubular radius rod 64, one of these rods 64 being mounted on each side of the mower. Engaging the opposite side of the ball head 61 is an annular plug 65 (Figure 4) also inserted in the enlarged portion 66 of the radius rod 64 and secured in position by a cotter pin 67 passing therethrough. The plug 65 is provided with an annular spherical seat 68 engaging the ball head 61, the neck 60 of which passes through an enlarged hole 69 in the side wall of the enlarged portion 66 of the radius rod 64.

The opposite end of each radius rod 64 is provided with a similar enlargement 70 containing a similar socket and plug construction to that shown in Figure 4, this construction engaging the ball head 71 of a bolt 72 which is threaded to receive a retaining nut 73 and is thereby bolted to a triangular bracket 74 (Figure 2) which in turn depends from and is bolted to the underside of the right-hand longitudinal frame member 12. In this manner, the radius rods 64 interconnect the frame 11 with the cutter reel unit 39 so that the latter may swing upward or downward as the ground roller 49 encounters hummocks or depressions in the ground being mowed.

The side plates 40 of the cutting reel unit 39 are interconnected by tie rods 75 (Figures 1 and 3), the outer ends of which are reduced in diameter and threaded to receive retaining nuts 76 (Figure 7). Thus, the side plates 40 are interconnected by the two tie rods 75 and the cutter bar assembly 45. In order to strengthen the structure thus provided, and to prevent weaving thereof, with consequent distortion or twisting of the cutter bar 45 and uneven engagement thereof with the spiral cutting reel blades 44, the tie rods 75 are provided with a bridge structure, generally designated 77. The bridge structure 77 is connected to the tie rods 75 (Figure 5) in close proximity to the side frames or side plates 40 by U-shaped clips 78 which encircle the tie rods 75 and are bolted to side bars 79 by bolts 80 threaded into threaded holes 81 in the ends of the bars 79, the bolts 80 passing through the clips 78 and through spacing members 82 into the threaded holes 81.

Secured as by welding to and resting upon the spacing members 82 of the forward clips 78 (Figures 5 and 7) is an elongated angle member 83 of L-shaped cross-section which thereby additionally interconnects and strengthens the framework formed by the side plates 40, tie rods 75 and cutter bar assembly 45. An additional strengthening effect, as well as protection of the cutter reel unit 39 from dust and grit falling upon it, is provided by a sheet metal apron 84 (Figure 5) the rearward portion of which is secured by the screws 85 to the bars 79 by being threaded into holes 86 therein. The rearward edge of the apron 84 is provided with a downwardly turned flange 87 to further strengthen and protect the parts. The forward edge of the apron 84 is also provided with a downwardly bent flange 88 which, together with the downwardly turned portion of an angle member 89 is secured to the upwardly turned portion of the angle member 83 by screws 90 threaded therethrough at intervals therealong.

Secured as by welding to the angle member 83 at approximately the mid-point thereof is an upright arm 91 (Figures 2, 3 and 6) for raising and lowering the cutting reel unit 39 and for additionally connecting it to the forward part of the mower 10. The arm 91 is provided with a transverse hole 92 in which is seated a ball-headed bolt 93 similar to the bolts 72 and similarly provided with a ball head 94. The ball head 94 is received within the enlarged portion 95 of a connecting rod 96 and is provided with a socket plug construction similar to that contained within the enlarged portions 66 and 70 of the radius rods 64 and shown more particularly in Figure 4.

The connecting rod 96 is provided at its rearward end with a tubular transverse portion 97, this assembly being approximately T-shaped (Figure 1). The transverse portion 97 is journaled upon a shaft 98 which in turn is journaled in the downwardly projecting flanges of the forward ends of the longitudinal frame members 14. Pinned to the opposite ends of the shaft 98 are the hubs 104 of a U-shaped bail or lifting member 105, the cross bar 106 of which extends beneath the connecting rod 96.

The U-shaped member 105 is provided with an upwardly extending arm portion 107 carrying a pivot pin 108 (Figure 2) to which is pivoted a link 109. The opposite end of the link 109 is pivoted to a pivot pin 110 mounted in the lower end of a hand lever 111, which in turn is pivotally mounted upon a pivot member 112 carried by a J-shaped member 113. The opposite ends of the J-shaped member 113 are bolted as at 114 and 115 to an upwardly curved elongated member 116, the latter being bolted as at 117 to angle brackets 118 which in turn are bolted as at 119 to the frame cross members 13.

Also bolted as at 120 and 114 to the J-shaped member 113 is a sector-shaped ratchet plate 121, the teeth of which are engaged by a pawl 122 upon the end of a link 109. An operating rod 123 is hooked at its lower end into the pawl 122 and passes upward through the hand lever 111, which is of tubular construction, to a knob 124 reciprocably mounted in the upper end or handle portion 125 of the hand lever 111.

Operation

In operation, the engine 16 is started and rotates the axle 22 by means of the sprocket 21, thereby transmitting power to the brake and clutch units 23 and thence to the wheels 24, propelling the mower 10 by means of its tires 25 engaging the ground. At the same time, the rotation of the countershaft 20 transmits power through the sprocket 35 and sprocket chain 36 to the sprocket 37 on the cutting reel shaft 38, rotating the latter and cutting the grass between the spiral blades 44 and the cutter bar assembly 45 as the mower 10 moves forward.

As the mower moves forward and the ground roller 49 rises and falls in traversing hummocks or depressions, the cutting reel unit 39 rises and falls, swinging up and down on the radius rods 64 and connecting rods 96 around the pivots 71 and 102 thereof respectively, this construction, in effect, constituting a parallel link mechanism. If it is desired to raise the cutting reel unit 39 completely off the ground and terminate its cutting action completely, the handle portion 125 of the hand lever 101 is grasped by the operator and the knob 124 pushed downward by his thumb, disengaging the pawl 122 from the teeth of the ratchet plate 121. The operator then swings the hand lever 111 forward, thereby swinging the cross-portion 106 of the U-shaped member or bail 105 upward into engagement with the connecting rod 96, swinging the latter upward around its pivot shaft 102 and thereby lifting the cutting reel unit 39 through the ball connection 94 of the connecting rod 96 with the arm 91 rising from the top of the cutting reel unit 39. When the operator releases the knob 124 with the hand lever 111 swung into its forward position, the pawl 122 re-engages with the ratchet plate 121, locking the hand lever 111, the connecting rod 96, arm 91 and cutting reel unit 39 in their raised positions. To lower the cutting reel unit 39 into its cutting position, the operator reverses the foregoing procedure, swinging the hand lever 111 rearward into the position shown in Figure 2.

If the cutter bar assembly 45 is not in the proper position for the grass being cut (Figure 4), the operator removes the nuts 58 from the bolt members 57, withdraws these from the holes 52 in the shaft hangers 47 which they then occupy, and reinserts the shanks 56 in the preferred hole 52, raising or lowering the shaft hangers 47 until the cutter bar assembly 45 is properly positioned by means of the adjusted position of the ground roller 49. The operator then replaces the nuts 58 to clamp the assembly securely together in its adjusted position. By this means, the member 57 serves as a combined adjusting bolt and radius rod connection, considerably simplifying the construction.

While I have shown and described my invention in detail, it is to be understood that the same is to be limited only by the appended claims, for many changes may be made without departing from the spirit and scope of my invention.

What I claim is:

1. An auxiliary strengthening structure for attachment to the tie members of the side members of a power lawnmower cutting reel unit, said strengthening structure comprising a frame disposed above said tie members and extending substantially from one side member to the other side member, and fasteners securing said frame of said strengthening structure to said tie members adjacent their junction with said side members, said frame including an elongated longitudinally-flanged member disposed above one of said tie members.

2. An auxiliary strengthening structure for attachment to the tie members of the side members of a power lawnmower cutting reel unit, said strengthening structure comprising a frame disposed above said tie members and extending substantially from one side member to the other side member, and fasteners securing said frame of said strengthening structure to said tie members adjacent their junction with said side members, said frame including an elongated longitudinally-flanged member disposed above one of said tie members and a pair of cross members extending between said tie members adjacent the opposite ends thereof.

3. An auxiliary strengthening structure for attachment to the tie members of the side members of a power lawnmower cutting reel unit, said strengthening structure comprising a frame disposed above said tie members and extending substantially from one side member to the other side member, and fasteners securing said frame of said strengthening structure to said tie members adjacent their junction with said side members, said frame including an elongated longitudinally-flanged member disposed above one of said tie members and a pair of cross members extending between said tie members adjacent the opposite ends thereof, said longitudinally-flanged member being mounted on said cross members above said first-mentioned tie member.

4. An auxiliary strengthening structure for attachment to the tie members of the side members of a power lawnmower cutting reel unit, said strengthening structure comprising a frame disposed above said tie members and extending substantially from one side member to the other side member, and fasteners securing said frame of said strengthening structure to said tie members adjacent their junction with said side members, said frame including a plurality of interconnected longitudinally-flanged members.

5. An auxiliary strengthening structure for attachment to the tie members of the side members of a power lawnmower cutting reel unit, said strengthening structure comprising a frame disposed above said tie members and extending substantially from one side member to the other side member, and fasteners securing said frame of said strengthening structure to said tie members adjacent their junction with said side members, said frame including a plurality of interconnected longitudinally-flanged members and a pair of cross members extending between said tie members adjacent the opposite ends thereof.

6. An auxiliary strengthening structure for attachment to the tie members of the side members of a power lawnmower cutting reel unit, said strengthening structure comprising a frame disposed above said tie members and extending substantially from one side member to the other side member, and fasteners securing said frame of said strengthening structure to said tie members adjacent their junction with said side members, said frame including a plurality of interconnected longitudinally-flanged members and a pair of cross members extending between said tie members adjacent the opposite ends thereof, said longitudinally-flanged members being mounted on said cross members above said first-mentioned tie member.

7. An auxiliary strengthening structure for attachment to the tie members of the side members of a power lawnmower cutting reel unit, said strengthening structure comprising a frame disposed above said tie members and extending substantially from one side member to the other side member, and fasteners securing said frame of said strengthening structure to said tie members adjacent their junction with said side members, said frame including a plate-like cover member extending between said tie members.

8. An auxiliary strengthening structure for attachment to the tie members of the side members of a power lawnmower cutting reel unit, said strengthening structure comprising a frame disposed above said tie members and extending substantially from one side member to the other side member, and fasteners securing said frame of said strengthening structure to said tie members adjacent their junction with said side members, said frame including an elongated longitudinally-flanged member and a plate-like cover member extending between said tie members and secured to said longitudinally-flanged member.

9. A combined ground roller bracket adjustment and radius rod connection device attachable to the side plates of cutting reel units of power lawn-mowers, said device comprising a ground roller shaft bracket engaging each side plate, a fastener having a ball head adapted to receive a corresponding socket on one end of each radius rod a threaded shank on said fastener passing through said side plate and said ground roller shaft bracket, and a threaded clamping member on said shank.

10. A combined ground roller bracket adjustment and radius rod connection device attachable to the side plates of cutting reel units of power lawn-mowers, said device comprising a ground roller shaft bracket engaging each side plate, a fastener having a ball head adapted to receive a corresponding socket on one end of each radius rod a threaded shank on said fastener passing through said side plate and said ground roller shaft bracket, and a threaded clamping member on said shank, said ground roller bracket slidably engaging said side plate and said shank adjustably holding said bracket against said side plate.

HAROLD L. BLYDENBURGH.

REFERENCES CITED

The following references are of record in the file of this patent:

UNITED STATES PATENTS

| Number | Name | Date |
|---|---|---|
| 1,551,543 | Coldwell | Sept. 1, 1925 |
| 1,819,133 | Stegeman et al. | Aug. 18, 1931 |
| 1,886,408 | Locke et al. | Nov. 8, 1932 |
| 1,947,117 | Stegeman et al. | Feb. 13, 1934 |
| 2,335,054 | Godwin | Nov. 23, 1943 |
| 2,378,488 | Loewe et al. | June 19, 1945 |

FOREIGN PATENTS

| Number | Country | Date |
|---|---|---|
| 4,760 of 1931 | Australia | Nov. 2, 1932 |